United States Patent [19]  
Werner et al.

[11] Patent Number: 5,223,777  
[45] Date of Patent: Jun. 29, 1993

[54] NUMERICAL CONTROL SYSTEM FOR IRREGULAR POCKET MILLING

[75] Inventors: Timothy W. Werner, Mayfield Heights; Subbian Govindaraj, South Euclid; Timothy Bielawski, Maple Heights; William C. Schwarz, Shaker Heights; Paul S. Kramer, Mentor, all of Ohio

[73] Assignee: Allen-Bradley Company, Inc., Milwaukee, Wis.

[21] Appl. No.: 863,628

[22] Filed: Apr. 6, 1992

[51] Int. Cl.$^5$ ............................................. G05B 19/405  
[52] U.S. Cl. ..................................... 318/569; 318/571; 364/191; 364/474.26; 364/474.27; 364/474.29  
[58] Field of Search .................................. 318/560-574; 364/200, 261.6, 474.01–474.32, 267.3, 191; 395/133, 143, 142, 150

[56] References Cited

U.S. PATENT DOCUMENTS

| | | |
|---|---|---|
| 3,866,179 | 2/1975 | McGee et al. |
| 4,535,408 | 8/1985 | Kishi et al. ............................ 364/475 |
| 4,591,968 | 5/1986 | Nozawa et al. ....................... 364/167 |
| 4,672,550 | 6/1987 | Winterbottom et al. ............. 364/474 |
| 4,904,914 | 2/1990 | Seki et al. ............................. 318/567 |
| 4,926,311 | 5/1990 | Matsumura et al. ............. 364/474.22 |
| 4,926,338 | 5/1990 | Nankaku ........................ 364/474.32 |
| 4,949,270 | 8/1990 | Shima et al. .................... 364/474.26 |
| 4,951,217 | 8/1990 | Clack et al. ...................... 364/474.2 |
| 4,985,840 | 1/1991 | Shinozaki ........................... 364/474 |
| 5,068,802 | 11/1991 | Miyashita et al. .................. 395/133 |
| 5,068,805 | 11/1991 | Tsuzuki ............................... 395/164 |
| 5,095,440 | 3/1992 | Suzuki et al. .................... 364/474.33 |
| 5,115,479 | 5/1992 | Murayama ......................... 395/142 |
| 5,122,965 | 6/1992 | Nishida et al. ................. 364/474.24 |

FOREIGN PATENT DOCUMENTS 0096752 12/1980 Japan.  
0152510 12/1987 Japan.  
0228756 3/1988 Japan.

Primary Examiner—Paul Ip  
Attorney, Agent, or Firm—Quarles & Brady

[57] ABSTRACT

A numerical controller accepts an instruction for the cutting of pockets with perimeters of irregular shapes, the instruction defining the perimeter by a series of vertex points and a straight-line, circular, or some other interpolation to move between these vertices. The numerical controller cuts the perimeter of the pocket by reference to the vertex points and constructs a bit map indicating the cut and uncut material after completion of the perimeter. A rule-based path generator employs the bit map to complete the interior of the pocket without explicit programming of those interior tool motions. The bit map is constructed on a real-time basis by offsetting the tool motion coordinates to roll over in the bit map space regardless of the tool starting position.

5 Claims, 3 Drawing Sheets

FIG. 2
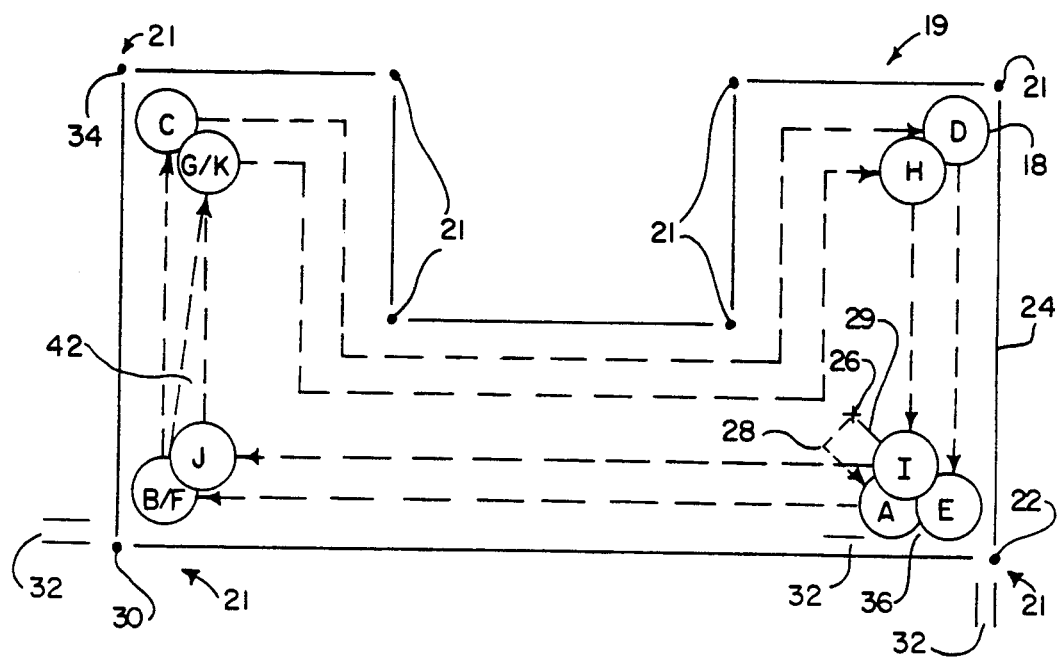
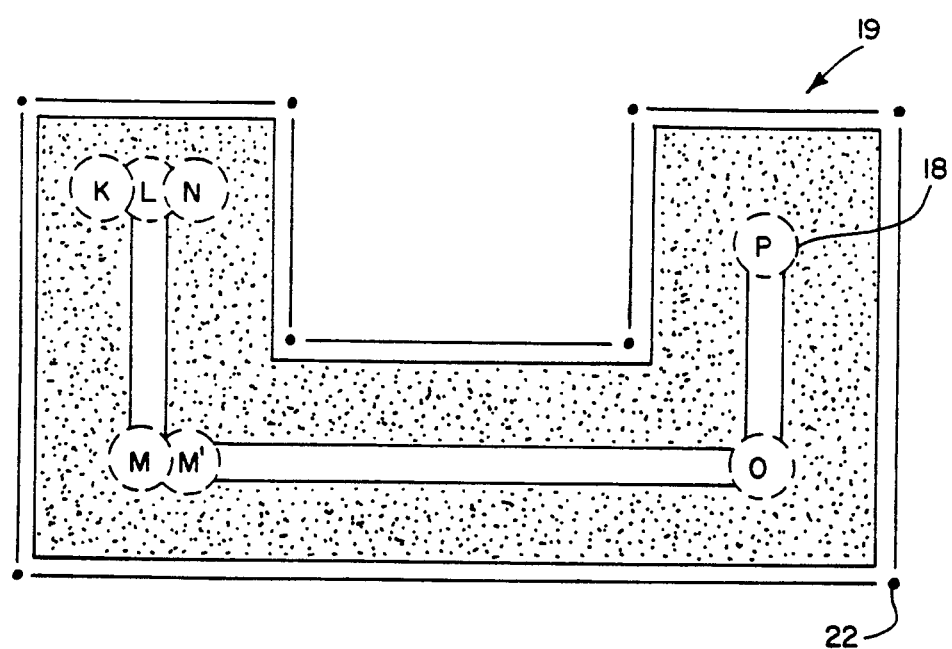
FIG.5

NUMERICAL CONTROL SYSTEM FOR IRREGULAR POCKET MILLING

BACKGROUND OF THE INVENTION

The present invention relates to numerical control systems for controlling machine tools and the like according to a sequence of program instructions, and in particular, to a numerical control system for use in cutting pockets with irregular perimeters.

Numerical control systems are computing devices adapted for the real-time control of machine tools. A numerical controller receives a set of coded instructions forming a "part program". The instructions of the part program describe a sequence of machining operations to be performed to create a finished machine part. The numerical controller converts the instructions to a series of electrical signals which control servo or stepper motors attached to a machine tool to move the tool appropriately or which control special accessories, such as tool changers, to allow automated control of machine setup operations traditionally performed by hand.

For example, in the case of a numerical controller operating a vertical milling machine, the instructions of the part program may include "setup" instruction which specify, for example, the type of milling tool, the rate of feed of the tool through the material being machined, the spindle speed at which the tool rotates, and other general parameters of the machining operation. Other instructions referred to herein as "positioning instructions" control the actual movement of the tool over the surface of the part during the actual machining operation. For complex parts involving many discrete movements of the tool, these positioning instructions comprise the majority of the instructions for the part program.

The manageability of a part program decreases with increasing numbers of positioning instructions. This is true primarily because of the difficulty of writing and editing part programs that are extremely lengthy. Memory limitations within the numerical controller, however, also make it desirable that the number of positioning instructions in a part program be limited.

For certain shapes, notably those that are geometrically regular, such as circular or square pockets cut in a part face, the length of the part program can be minimized by the use of high-level instructions which incorporate only key dimensions of the pocket and generate the necessary positioning instructions on a real-time basis. Thus, for cutting a circular pocket, the depth and radius alone might be specified by the programmer and coded into the part program. During machining the precise tool path is calculated mathematically from these critical dimensions in real-time, eliminating the programming and storing of a large number of positioning instructions. Because explicit positioning instructions are eliminated, the length and complexity of the part program can be substantially reduced.

Provided the critical data used to define the pocket shape is carefully selected, the pocket described by the high-level instruction, may be readily translated in space, rotated or scaled in size without the need for additional calculation by the programmer. Clearly the programming time for each pocket is reduced to the extent that the writing of explicit positioning instructions by the programmer can be avoided.

This approach of using high-level instructions is well adapted to the cutting of pockets whose perimeters are circular or well defined regular polygons. In these cases, the optimal tool path is easily determined, predictable and may be generated by simple mathematical operations. Unfortunately, high-level instructions are not easily adapted to the creation of irregular pockets, i.e. pockets whose perimeters are made up of irregular straight and curved line segments. There is no simple and generalizable mathematical description for the path necessary to remove material from the interior of an irregular pocket. This is particularly evident when the perimeter of the pocket is concave and when the efficient removal of material from the interior of the pocket will produce multiple islands of uncut material.

SUMMARY OF THE INVENTION

The present invention is a numerical controller for interpreting high-level instructions for the cutting of irregular pockets. The numerical controller receives positioning instructions defining the perimeter of the pocket and generates, in real-time, the tool path for the interior of the pocket by reference to a bit map and a set of rules. Unlike high-level instructions for regular pockets, the particular tool path will change as the pocket is scaled and/or rotated, however these changes will be invisible to the programmer.

Specifically, an interpreter receives instructions defining the perimeter of the pocket and provides axis motion signals to a motion controller for moving a tool along that perimeter. The numerical control system includes a bit map for storing the swept volume of the tool as it is translated by the motion controller and an instruction generator for reading this bit map and generating further axis motion signals based on the bit map. These further axis motion signals sweep the tool through the interior of the pocket.

It is thus one object of the invention to provide a high-level instruction to define irregular pockets with a small number of critical parameters instead of a large number of positioning instructions. Each pocket is defined by a limited set of positioning instructions which describe the perimeter of the pocket and additional tool motion necessary to clean the inside of the pocket is determined on a real-time basis by reference to the bit map.

It is yet a further object of the invention to generate effective positioning instructions for the cleaning out of an irregular pocket absent any simple mathematical description of a tool path within that irregular pocket. The use of a bit map allows a general, rule-based description of the path for cleaning out the interior of the pocket to be used when a predetermined, whether or not a specific mathematical description of the tool path may be determined. The invention is, of course, not limited to irregular shapes, but generally applicable to pockets with regular perimeters as well.

It is yet a further object of the invention to provide high-level instructions for milling irregular pockets, which instructions simplify the scaling, rotation or translation of the pocket. By limiting the critical parameter of the high-level instruction to the positioning instructions for the perimeter of the pocket, only these positioning instructions need be changed by the programmer. The use of a bit map and rule-based tool control allows automatic recomputation of the tool motion required for the interior of the pocket without further work by the programmer.

Other objects and advantages besides those discussed above shall be apparent to those experienced in the art from the description of the preferred embodiment of the invention which follows. In the description, reference is made to the accompanying drawings, which form a part hereof, and which illustrate one example of the invention. Such example, however, is not exhaustive of the various alternative forms of the inventions and therefore reference is made to the claims which follow the description for determining the scope of the invention.

BRIEF DESCRIPTION OF THE DRAWINGS

FIG. 2 is a plan view of an irregular pocket showing tool paths for cutting a perimeter according to the present invention;

FIG. 5 is a view similar to that of FIG. 2 showing the remaining uncut area of the irregular pocket after completion of cuts around the perimeter of the pocket.

DETAILED DESCRIPTION OF THE PREFERRED EMBODIMENT

A high-level instruction for cutting an irregular pocket according to the present invention is shown in Table 1 and follows the format of a standard alpha-code such as is used in the industry.

TABLE 1

G89.1 X_ Y_ Z_ P_ Q_ H_ E_ F_ L_

As is understood in the art, each alpha-code comprises a single alphabetic character, such as "G" optionally followed by a numeric argument.

In the preferred embodiment, the high-level instruction of the present invention for cutting irregular pockets employs the alpha-code: G89.1. This alpha-code G89.1 is followed by additional alpha-codes and arguments as shown in Table 1 (the arguments of these later alpha-codes indicated by "_") which together form a G89.1 "block" typically terminated by an end-of-line character (not shown). Further alpha-codes, elsewhere in the part program, complete the high-level instruction of the present invention and will be described below.

The arguments of the additional alpha-codes shown in Table 1 following the G89.1 code within the G89.1 block, define the parameters of the high-level instruction as indicated in Table 2.

TABLE 2

| Alpha-code | Meaning of Argument |
|---|---|
| X, Y | spatial coordinates of the starting corner of the irregular pocket |
| Z | spatial coordinate of the bottom of the pocket |
| P | starting address in the part program containing positioning instructions defining the perimeter of the pocket |
| Q | ending address in the part program containing positioning instructions defining the perimeter of the pocket |
| H | finish allowance on the sides of the pocket |
| E | feed rate for plunging of the tool |
| F | feed rate for the rough cutting of the pocket |
| L | depth of each successive roughing cut of the pocket |

The part program, for machining a part under the control of a numerical controller will generally include a number of other additional alpha-codes collected into other program lines providing other instructions for the performing of different machining tasks such as are well known in the art. In the part program, before the high-level instruction for cutting irregular pockets, the programmer must have provided suitable alpha-codes for defining tool radius and other matters of machine tool set-up and for positioning the tool within the perimeter of the irregular pocket to be formed.

All of the alpha-codes of the part program and their arguments are generated by the programmer and typically loaded into a digital memory within the numerical controller. The numerical controller incorporates a processing unit for the interpretation of the alpha-codes and their arguments in accordance with a stored interpreting program. A numerical controller representative of the art is described in U.S. Pat. No. 4,228,495 entitled: "Multiprocessor Numerical Control System" assigned to the same assignee as the present invention and hereby incorporated by reference.

Figure 1:
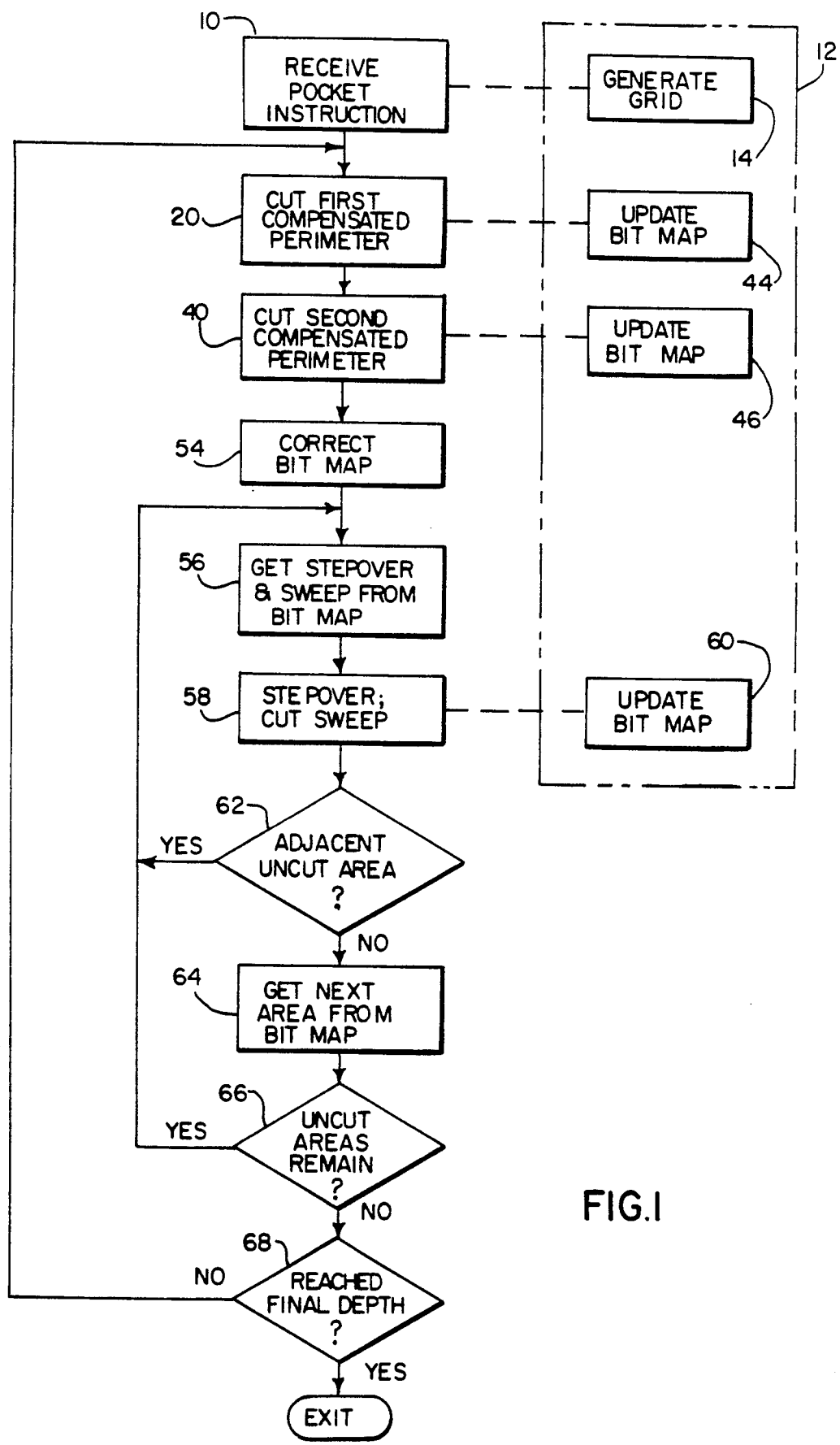
FIG. 1 is a flow chart showing the processing of a high-level irregular pocket instruction by a numerical controller of the present invention.

Referring now to FIG. 1, the interpreting program running in the processing unit of the numerical controller, receives the irregular pocket instruction as indicated by process block 10. Upon receiving an irregular pocket instruction, the processor initiates a bit mapping procedure involving the process blocks collectively denoted 12 each of which will be described in detail below. This bit mapping procedure 12 runs in the "background" according to well understood computer techniques, to perform its task apparently in parallel with the foreground tasks which make up the main portion of the interpreting program. The parallel nature of the bit mapping 12 is indicated by horizontal dashed lines connecting the bit mapping process blocks 12 to corresponding process blocks of the interpreter program outside of the dashed lines.

As indicated by process block 14 of the bit mapping procedure 12, the first step of the bit mapping procedure is the generation of a spatial grid representing the physical space in which the tool moves. This grid provides a means for equating the position of the cutting tool of the milling machine to an address in a bit map contained within the memory of the numerical controller. The bit map will be used to track tool motion and will provide data during subsequent steps of the interpreter program to generate tool motion for cutting the pocket interior.

Figure 4:
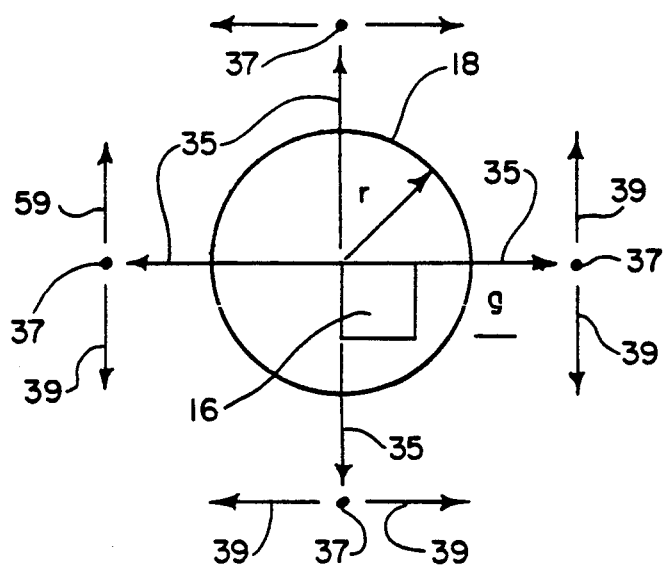
FIG. 4 is a schematic view of the cutting area of a tool showing the determination of the grid size of the bit map of FIG. 3 and showing the different step-over directions of the tool.

Referring to FIG. 4, generating the grid involves principally determining the dimension of a single grid element or pixel 16 which is tessellated in rectilinear rows and columns to form the entire grid. The pixel 16 is a square whose height is based on the cutting diameter 18 of the tool, and specifically, a square having a length equal to 0.707 times the radius of the tool area 18. This pixel size ensures that if the center of the tool diameter 18 passes anywhere within the area of a given pixel 16, that the entire area of the pixel 16 will be covered by the tool. The pixel size is also used as the "step-over" amount during the removal of material from the interior of the pocket 19 as will be described below.

A bit map in the memory of the numerical controller is associated with each pixel of this grid and is set or reset to provide a record of the area cut by the tool as will be described below. Initially all the bits of the bit map are reset to zero indicating no material has been cut.

Referring now to FIGS. 1 and 2, after receiving the irregular pocket instruction indicated by process block 10 (and the parallel generation of the grid indicated by process block 14), the interpreter program prepares to cut the perimeter of the irregular pocket 19 at process block 20. This cutting requires determination of the vertices 21 of the irregular polygon defining the perimeter 24 of the irregular pocket 19. These vertices 21 are included in the G89.1 block and the blocks defined by the P and Q alpha-codes contained within the G89.1 block as described above.

The first vertex 21, designated the start/end point 22, is provided by the arguments of the X and Y alpha-codes of the G89.1 block, also as previously described. In addition to reading the start/end point 22 from the X and Y alpha-codes, the coordinate points for additional vertices 21 are obtained, from the blocks defined by the P and Q alpha-codes, to permit the interpreter to look ahead to the future path of the tool to prevent the tool from crossing the perimeter 24 especially at acute corners. Nevertheless, this looking ahead is limited to only a few vertices 21 so as not to sacrifice the speed necessary for real-time processing.

At process block 20, the tool plunges downward into the pocket 19, to a depth indicated by alpha-code L of the G89.1 block. Typically, this plunging will occur over a predrilled hole to permit faster plunge rates and to allow the use of cutting tools without downward facing cutting edges.

After plunging at point 26 of FIG. 2, located by earlier instructions to be somewhere within the pocket 19, the tool is guided toward the perimeter 24. Typically the actual movement of the tool will be under the control of an additional background instructions (not shown) which: (1) provide real-time interpolation between the endpoints of the tool path (2) adjust the tool motion to accommodate differing tool radii and (3) provide a finish allowance 32 displaced from the actual perimeter 24 of the pocket 19. The finish allowance 32 permits a subsequent second smoother pass around the perimeter 24.

In moving toward the perimeter 24 from the plunge point 26, the tool jogs first to an offset point 28 by distance equal to half the tool diameter 18 and perpendicular to a line 29 between the plunge point 26 and start/end point 22. The tool is then controlled to proceed along on a path parallel to the line 29 towards a portion of the perimeter 24 defined by a segment between the start/end point 22 and a first vertex 30.

As limited by the background tool movement instructions, the tool stops before touching the wall between start/end point 22 and first vertex 30, preserving the finish allowance 32. The purpose of this shifting action is to prevent the tool from approaching the perimeter 24 directly at start/end point 22 without knowledge of the vertex angle (which requires knowledge of all the vertices 21) and inadvertently cutting through the perimeter 24.

Thus, the tool stops at position A as shown in FIG. 2, just offset from the start/end point 22 and removed from the wall by finish allowance 32. Coordinates of a second vertex 34 are then read from the block defined by the P and Q alpha-codes and the tool proceeds to position B near first vertex 30 and removed from the lines between start/end point 22 and first vertex 30 and the first vertex 30 and the second vertex 34 by finish allowance 32.

The tool thus proceeds around the perimeter 24 displaced such inside that perimeter 24 by the finish allowance 32 and passing from positions B to C to D and then to E which is next to the start/end point 22. A small area 36 between position E and position A remains and is removed by the tool next proceeding to position F, being the same as previously described position B. The first perimeter cut of process block 20 is then complete. The tool movement during the process block 20 is monitored and recorded by updating the bit map in the memory of the processor of the numerical controller as indicated by background process block 44. Further, the minimum coordinates among the vertices 21 of the perimeter 24 is recorded to be used later.

Referring still to FIGS. 1 and 2, as shown by process block 40, the stored value indicating the radius of the tool provided by a previous alpha-code is next artificially doubled so as to permit the simple generation of a second pass around the perimeter 24, positioned one-half the tool diameter 18 inside the first pass defined by positions E, B, C, and D of FIG. 2. This second pass simply provides a somewhat bigger channel inside the perimeter 24 to allow the tool to be raised and lowered for movements between portions of the irregular pocket 19 at high speed without concern for brushing into uncut material.

Referring to FIG. 2 at position F, as a function of the compensation routine's looking ahead, the artificially increased radius is first implemented so that the tool proceeds diagonally to a position G removed from the walls of the perimeter 24 about second vertex 34 by finish allowance 32 plus one-half the tool diameter 18 of the tool. Thus, after reaching position J, a small area 42 of uncut material remains along the diagonal path from position F to G. This area is removed by advancing the tool to position K being the same as previously described position G.

At this time, a channel has been cut completely around the perimeter 24 having a width of one and one-half times the tool diameter 18 and displaced inward within the perimeter 24 by the finished allowance 32, per process block 40. Again, the tool movement during the process block 40 is monitored and recorded by updating a bit map in the memory of the processor of the numerical controller as indicated by background process block 46.

Figure 3:
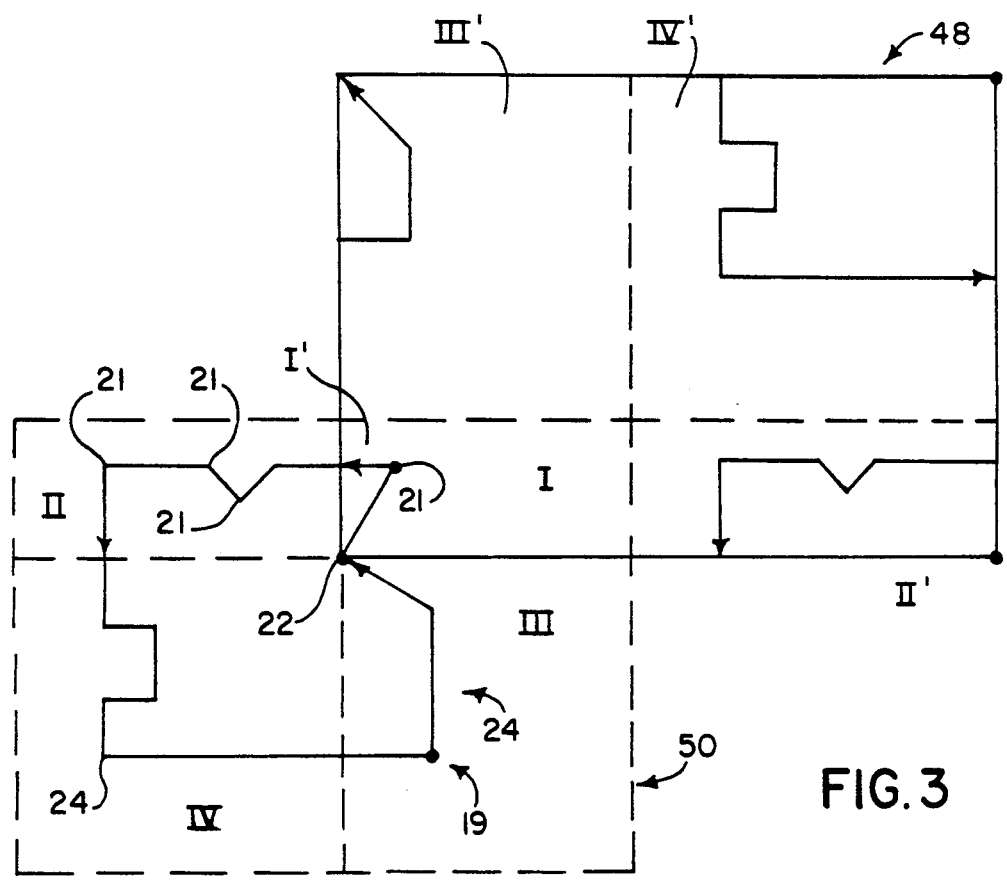
FIG. 3 is a graphical representation of memory space superimposed on actual physical space showing a tracing of an irregular pocket and the recording of the tool path in a bit map in memory.

Referring to FIG. 3, the bit map 48, as described above, is a two dimensional array in the memory of the numerical controller. The bit map has bits with coordinates describing row and column addresses, each bit corresponding to one pixel 16 of the grid created in process block 14. The updating of the bit map, represented by process blocks 44 and 46, involves tracking coordinates of the center of the tool diameter 18 and comparing those coordinates to the coordinates of the vertices of the pixels 16 of the grid. As noted, the proper choice of the grid size ensures that if the center of tool diameter 18 falls anywhere within the vertices of the pixel 16, the entire area of the pixel 16 will have been swept clean by the tool. Thus, when the area of a pixel 16 is crossed by the center of the tool diameter 18, the corresponding bit of the bit map may be set indicating the material of the pixel has been removed and thus establishing a cut record.

This updating of the bit map 48 requires establishing a relationship between the coordinates of pixels 16 of physical space 50 and the coordinates of the bits of the bit map 48. Generally, it cannot be assumed that the start/end point 22 is at the pixel in physical space 50 with the lowest valued coordinates of all the pixels of the pocket 19. Otherwise, establishing the correspondence between coordinates of bits of the bit map 48 and coordinates of pixels 16 of physical space 50 would require no more than using the grid coordinates of the start/end point 22 as an offset value, the coordinates for each bit of bit map 48 being the coordinates of each subsequent pixel minus the corresponding offset value.

For example, if the lowest address of the bit map is (0,0) and the minimum x and y coordinates of the vertices 21 in physical space 50 are ($-24$, 106) then the values (24) and ($-106$) might be added to each x and y coordinate of cut pixels 16 to obtain the proper coordinates of the corresponding bit within the bit map 48.

Given the ability to look through the coordinates of each vertex 21 of the perimeter 24, this approach might be employed for use with any start/end point 22 simply by searching for the minimum values of each vertex coordinate, and adopting those minimum coordinates as the offset values between pixel and bit map coordinates. This method, however, requires that the numerical control system search ahead through the vertex data to obtain minimum values and is, therefore, time consuming and not considered desirable in the context of real-time processing.

An alternative approach of may be adopted of identifying the pixel of the start/end point 22 to the centermost bit of the bit map 48 thus ensuring that some bits of the bit map 48 are available on all sides of this first bit for the mapping of subsequent vertices 21 regardless of the location of the subsequent vertices 21. It will be understood, however, that this approach is wasteful of memory and will require a bit map 48 capable of covering up to four times the area of the physical space 50 of the pocket 19. This follows from the fact that the start/end point 22 may be in any "corner" of the pocket 19 and the subsequent vertices 21 of the perimeter 24 may extend solely into any one of the four quadrants surrounding the center of the bit map 48. Each quadrant must therefore be sized to hold the entire perimeter of the pocket 19.

Accordingly, the present invention employs a different approach, where bits of the bit map 48 are allocated to pixels 16 on a real-time basis by "folding" the space of the bit map 48 and then subsequently unfolding that space 48 to eliminate discontinuities in the bit map representation of the physical space 50.

In this method, the pixel holding the first point of the perimeter 24, assumed for the simplicity of description to be the start/end point 22, and is assigned arbitrarily to the lowest valued coordinates of the bit array 48.

If the subsequent vertices 21 of the perimeter 24 have higher coordinate values than the coordinate of the start/end point 22 (quadrant (I)), the vertices of the perimeter 24 are mapped simply into the bit array 48. That is:

$$x_b = x_p + x_0$$
$$y_b = y_p + y_0 \tag{1}$$

where $x_b$, $y_b$ and $x_p$, $y_p$ are the coordinates of the bits in the bit map and the pixels in physical space respectively and $x_0$ and $y_0$ are offset values being the values of the lowest coordinates of the bit map 48 minus the coordinate values of the start/end point 22.

For vertices that have either x or y coordinate with relatively lower values than the corresponding value of the coordinate for the start/end point 22, those vertices are mapped into the bit array 48 in a modulo fashion. That is, in quandrant II of real-space 50 where the y coordinates of the pixels 16 are more negative than the y coordinate of the start/end point 22 but the x coordinate of the pixels 16 is more positive than the x coordinate of the start/end point 22. Then the mapping is as follows:

$$x_b = x_p + x_0 + x_{max}$$
$$y_b = y_p + y_0 \tag{2}$$

where $x_{max}$ is the maximum x coordinate of the bit map 48.

In a similar manner, in quadrant III of real-space 50 having x coordinates less than the x coordinate of the start/end point 22 but y coordinates greater than the y coordinate of the start/end point 22, the bits are mapped as follows:

$$x_b = x_p + x_0$$
$$y_b = y_p + y_0 + y_{max} \tag{3}$$

where $y_{max}$ is the maximum y coordinate of the bit map

Finally, in a quadrant IV of real space 50, where both the x and y coordinates of the pixels 16 are smaller than the x and y coordinate of the start/end point 22, the coordinates are mapped as follows:

$$x_b = x_p + x_0 + x_{max}$$
$$y_b = y_p + y_0 + y_{max} \tag{4}$$

The effect of this transformation is to essentially fold the bit map 48 so coordinate values outside its addresses roll over to the other edge of the bit map 48. The transformation involves only a simple subtraction or addition and thus can be performed in real-time with arbitrarily complex perimeters 24, provided the perimeter 24 is small enough so that for a given grid size, it can be accommodated with the bit map 48 given some offset.

Referring again to FIG. 1, this bit mapping to a folded bit map 48 is continued during process block 40.

At process block 54, the cutting of a path around the perimeter 24 has been completed and the bit map 48 may be "unfolded" or corrected to provide for easier processing in the later steps. This unfolding may be accomplished by examining each bit of the bit map 48 and adding or subtracting the corresponding value of $x_{max}$ or $y_{max}$ to its x and y coordinates depending on whether the result remains within the coordinate limits of the bit map 48. For example, for bits linked to pixels 16 in quadrant III, $x_{max}$ will be added to their x coordinates and $y_{max}$ subtracted from their y coordinates.

With the bit map 48 unfolded, per process block 54, the perimeter 24 is more simply represented within the array of bit map 48 in a contiguous fashion where the actual coordinates of the pixels represented by the bits are in simple monotonic relation to their coordinates in the bit map 48. This unfolded bit map 48 is employed for cutting the interior of the pocket 19 on a real-time basis.

Once the unfolded bit map 48 has been established, indicating the extent of the material to be cleared from the pocket, a second shadow bit map 48' (not shown) is produced which is a copy of the bit map 48 with the additional feature that all the bits are set or cleared according to whether they represent volume that is inside or outside of the perimeter 24. This is done by working inward from the outer edges of the bit map 48, these edges being known to be outside the perimeter 24. The second bit map 48' allows each pixel 16 to be distinguished as to whether it is inside or outside the perimeter 24 and, if it is inside the perimeter 24 whether it has been cut by the too or not. The two bit maps 48 and 48' together provide a cut record indicating what material of the pocket 19 remains to be cut.

Referring to FIGS. 1, 4, and 5, at process block 56, a step-over direction and sweep direction ar determined from the bits of the bit map 48 prior to cutting the interior of the pocket 19. The step-over direction is the initial motion of tool into uncut material prior to a sweep, the latter being generally perpendicular to the step-over direction. The step-over and sweep direction are determined by considering movement of the tool diameter 18 in each of four directions shown in FIG. 4 along the axes of the bit map 48. Assuming that the tool diameter 18 is shifted by one step-over distance 35 from its actual position to a step-over point 37, the bit map 48 is examined along the two orthogonal sweep directions 39 from each step-over point 37 to determine the total amount of uncut material along those sweep directions. The desired step-over direction and sweep direction are then determined from the combination which yields the greatest number of uncut bits indicated by the bit map 48.

Referring specifically to FIG. 5, at the completion of the perimeter passes, the tool is in position K. The cut portions of the pocket 19 are shown as shaded. The step-over direction determined by the above described procedure of process block 58 moves the tool from position K to position L at the corner of an uncut area of the pocket 19. The tool then sweeps along the sweep direction to position M per process block 58. During this cutting of process block 58, the bit map 48 is updated as indicated by process block 60. The updating process is substantially the same as previously described at process blocks 44 and 46. However, the bit map 48 is not folded but bits corresponding by pixels are determined by using an offset value determined at the end of the perimeter cut of process block 20 when all the vertices 21 of the perimeter 24 have been examined.

At the completion of each sweep, such as from position L to M, indicated by the end of uncut material as recorded in the bit map 48, the bit map 48 is examined at process block 62 to determine if additional uncut material exists in the step-over direction. If so, the same step-over is repeated, moving the tool to M', and the sweep direction is determined as indicated by process block 58. This step-over and sweeping of the tool is repeated according to a loop formed by process blocks 58 and 62 until no additional adjacent uncut area exists in the step-over direction. Referring to FIG. 5, this point is reached at position N where further step-over in the step-over direction would move the tool into the channel cut during the perimeter cutting steps of 20 and 40. In this case, the tool must be moved to the next uncut area as indicated by process block 64.

The next uncut area is determined by scanning all of the bits of the bit map 48 to locate those bits closest to the present position N of the tool. The tool is then moved to that position, M' as shown in FIG. 5, and the step-over and sweep direction are redetermined from the bit map 48 per process block 56. This loop of process blocks 56, 58, 64 and 66 are repeated until all uncut areas have been cut.

Referring to FIG. 5, the tool will then move from position M' to O and then to P completing the interior of the pocket 19.

Once all areas are cut the interpreter program checks to see if the final depth has been reached as indicated the argument of the Z alpha-code of the G89.1 block described above, and represented by process block 68. If the final depth has not been reached, the tool plunges downward into the pocket 19, to an additional depth indicated by alpha-code L of the G89.1 block at process block 20.

If the final depth has be reached, the program is exited and the interpreter receives the next alpha-code and may perform different operations involving different machining tasks and alpha-codes.

It will be understood that it is anticipated that the exact path of the tool for cutting the interior area of the pocket 19 will vary depending on a number of factors including the particular geometry of the perimeter 24 and the step-over distance. Nevertheless, the tool movement needed for cutting out the interior of the pocket 19 need not be defined by the programmer but is calculated on a real-time basis by process blocks 56 and 64. Further, it will be apparent that as the dimensions of the pockets are scaled, the tool path for removing material from the interior of the pocket will change, but that no additional programming will be required by the programmer.

Many modifications and variations of the preferred embodiment which will still be within the spirit and scope of the invention will be apparent to those of ordinary skill in the art. For example, the pocket need not be limited to right polygons but may be any shape that may be approximated with a polygon. Irregular posts within a pocket may be created by cutting two adjacent irregular pockets. Further, the sides of the irregular polygon need not be straight lines but may be curves produced by well known circular interpolation techniques.

It will be understood that although the primary benefit of the invention involves cutting irregular pockets, that the disclosed method is equally adaptable to cutting regular pockets and thus potentially eliminate the need for separate interpreting programs for such regular shapes. In order to apprise the public of the various embodiments that may fall within the scope of the invention, the following claims are made.

We claim:

1. A method employed by a numerical control device receiving instructions to control a machine tool having a cutting tool for machining a pocket in a part volume, the pocket having a perimeter, comprising the steps of:
   receiving instructions defining the perimeter of the pocket to produce first axis motion signals;
   translating the tool along a first swept path in the part volume conforming to the perimeter of the pocket and within the pocket as dictated by the first axis control signals;

storing the first swept path of the tool in a bit map to provide a cut record;

reading the bit map to generate second axis motion signals based on the cut record;

translating the tool through a second swept path in the part volume and within the perimeter as dictated by the second axis control signals; and storing the second swept path of the tool in the bit map to augment the cut record.

2. The method recited in claim 1 wherein the bit map includes a plurality of settable bits corresponding to points in the part volume and wherein the steps of storing of the first and second swept path of the tool further comprise:

setting the bits in the bit map corresponding to points in the part volume along the first and second swept path.

3. The method recited in claim 2 wherein each point in the part volume and each bit of the bit map has a coordinate and wherein the coordinates of the bit map have a maximum range and wherein the steps of setting of the bits further comprises:

identifying a first bit to a first point to produce an offset between the coordinates of the bits and the coordinates of the points;

shifting the coordinates of each point by the offset to determine initial coordinates of the corresponding bit of the bit map; and shifting the initial coordinates by the value of the maximum range if the initial coordinates are not within the maximum range.

4. The method recited in claim 1 wherein the step of reading the bit map to generate second axis motion signals further comprises:

generating the second axis motion signals so as to sweep the tool along a series of advancing contiguous parallel paths so long as the cut record indicates the presence of points adjacent to the tool, in the perimeter, and not within the first or second swept paths.

5. The method recited in claim 1 wherein the step of reading the bit map to generate second axis motion signals further comprises:

generating the second axis motion signals so as to sweep the tool to the closest points in the perimeter not within the first or second swept path, when the cut record indicates that there are no points adjacent to the tool, in the perimeter, and not within the first or second swept paths.

* * * * *